United States Patent
Phipps

(10) Patent No.: US 7,460,243 B2
(45) Date of Patent: Dec. 2, 2008

(54) MEASURING APPARATUS SENSITIVE TO ROTATIONAL BUT NOT TRANSLATIONAL OR VIBRATIONAL MOVEMENT

(76) Inventor: Claude R. Phipps, 200 - A Ojo de la Vaca Rd., Sante Fe, NM (US) 87508-8808

( * ) Notice: Subject to any disclaimer, the term of this patent is extended or adjusted under 35 U.S.C. 154(b) by 0 days.

(21) Appl. No.: 11/901,412

(22) Filed: Sep. 17, 2007

(65) Prior Publication Data
US 2008/0062433 A1    Mar. 13, 2008

Related U.S. Application Data

(63) Continuation of application No. PCT/US2006/013035, filed on Apr. 7, 2006.

(60) Provisional application No. 60/669,678, filed on Apr. 8, 2005.

(51) Int. Cl.
*G01B 11/00* (2006.01)
(52) U.S. Cl. .................................... 356/510
(58) Field of Classification Search ............... 356/496, 356/510, 520
See application file for complete search history.

(56) References Cited

U.S. PATENT DOCUMENTS

| | | | |
|---|---|---|---|
| 2,089,164 A | 8/1937 | Imhof | |
| 3,905,215 A * | 9/1975 | Wright | 356/510 |
| 4,086,808 A | 5/1978 | Camac et al. | |
| 4,286,879 A * | 9/1981 | Jager et al. | 356/496 |
| 4,383,762 A * | 5/1983 | Burkert | 356/455 |
| 4,472,054 A * | 9/1984 | Pouit | 356/510 |
| 4,717,255 A * | 1/1988 | Ulbers | 356/501 |
| 5,162,955 A * | 11/1992 | Burdenko | 360/77.02 |

OTHER PUBLICATIONS

Phipps et al, Micro Laser Plasma Thrusters for Small Satellites, Proceedings of the SPIE, vol. 4065, Aug. 2000, pp. 801-809.*
Phipps, Claude R. et al., "Diode Laser-based Microthrusters: A New Departure in High 1 sp, Long-Life Engines", *AIAA Journal* 40, No. 2 2002 , 310-318.
Phipps, Claude R. et al., "Laser Ablation of Organic Coatings as a Basis for Micropropulsion", *Thin Solid Films* 453-4, 573-83 2004 , 1-20.
Phipps, Claude R. et al., "Laser Ablation Powered Mini-Thruster", *Proc. SPIE* vol. 4760 2002 , 833-842.
Phipps, Claude R. et al., "Micro Laser Plasma Thruster for Small Satellites", *Proceedings of SPIE* vol. 4065 2000 , 801-809.

* cited by examiner

*Primary Examiner*—Samuel A Turner
(74) *Attorney, Agent, or Firm*—Jeffrey D. Myers; Peacock Myers, P.C.; Justin R. Jackson

(57) ABSTRACT

A measuring apparatus and method which is sensitive to rotational but not translational or vibrational movement. The magnitude of an applied rotational force is determined based upon interference patterns created from light reflected from an interferometric prism positioned to rotate in response to an applied rotational force.

10 Claims, 3 Drawing Sheets

MEASURING APPARATUS SENSITIVE TO ROTATIONAL BUT NOT TRANSLATIONAL OR VIBRATIONAL MOVEMENT

CROSS-REFERENCE TO RELATED APPLICATIONS

This application is a continuation of PCT application Ser. No. PCT/US06/13035, entitled "Precise Rotational Motion Sensor", filed on Apr. 7, 2006, and the specification thereof is incorporated herein by reference. This application also claims the benefit of the filing of U.S. Provisional Patent Application Ser. No. 60/669,678, entitled "New Rotational Sensor", filed on Apr. 8, 2005, and the specification thereof is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. FA9300-04-M-3101 awarded by the U.S. Air Force.

BACKGROUND OF THE INVENTION

1. Field of the Invention (Technical Field)

The present invention relates to the precise measurement of very small rotational motions without being sensitive to translational motions, as, for example, in measuring very small forces using a rotational torsion balance in a noisy vibrational environment.

2. Background Art

Known prior art interferometer-based measurement techniques lack the ability to accurately measure small distances in vibrationaly noisy environments. The first is the standard interferometer. The standard interferometer employs one mirror, which is stationary, while another mirror is attached to a torsion balance bar. That device is highly sensitive to vibrations because the fringes move when the moving mirror approaches or recedes from the laser.

Another known interferometer-based measurement technique is the etalon which has a thick plate of transparent material with two parallel surfaces. That device has the disadvantage that the second ray or beam involved in the interference pattern results from only one direct round trip through the plate rather than two, thus reducing the accuracy of measurements obtained therewith. In order to provide an etalon which has a thickness sufficient to allow a round trip which has a distance comparable to that obtained with a corner prism, the etalon plate must be about three times as thick as the depth of the prism. An etalon having such a thickness is thus large and bulky. Further, a reflective optical coating is required on the etalon's second face in order for effective operation to be provided. Such an optical coating further increases the cost of an etalon-based system.

Finally, an etalon which is created from two parallel plates with reflective and antireflective coatings separated by an air or vacuum space can be used for interferometer-based measurement techniques. In this etalon, as with that described above, the second ray or beam results after only one direct round trip through the device. Furthermore, since the path is through air or vacuum rather than glass, the plate separation must be not just about three but as much as five times greater than the depth of the corner cube prism to achieve the same sensitivity, thus adding substantially to the bulk of the device. Also, an additional structure is required to keep the plates parallel. Finally, the corner cube prism requires no optical coatings, in contrast to both of the etalon configurations, thereby substantially reducing the cost of the final interferometer.

Previously, building and using a torsion balance to measure very small forces in a microthruster development program were reported by the inventor. See C. R. Phipps, et al., "Laser ablation of organic coatings as a basis for micropropulsion", *Thin Solid Films*, 453-4, 573-83 (2004); and C. R. Phipps, et al., "Diode Laser-driven Microthrusters: A New Departure for Micropropulsion", *AIAA Journal*, 40, no. 2, pp. 310-318 (2002). A torsion balance is a string which suspends a balanced, horizontal bar with an object which generates a small force mounted on one end of the bar. The force applied to the end of the suspended horizontal bar causes the bar to rotate. The magnitude of rotation experienced by the bar is directly proportional to the force exerted on the end of the bar. Previously, the rotational motion due to the force was determined by noting the position on a fixed chart of the reflection of a 1 mm diameter laser beam from a small mirror mounted on the center of the bar. However, that technique precludes the ability to obtain measurements of less than about 10 micronewtons without exceeding about 10% accuracy. The limitation on the ability to obtain accurate measurements with that technique is due primarily to the diffraction of the laser beam. There is thus a present need for a method and apparatus for accurately measuring small forces.

BRIEF SUMMARY OF THE INVENTION

The present invention relates to a new technique for measuring very small forces. Another embodiment of the present invention relates to a new type of optical interferometer. Using the new technique, forces as small as about 100 nanonewtons can be measured with about 10% accuracy.

The present invention permits the measurement of forces as small as 100 nanonewtons in a vibrationally noisy environment. To do that, the apparatus of the present invention preferably measures rotations as small as 60 microradians (0.0034 degrees) without being substantially interfered with by the vibrations.

The present invention preferably attaches an uncoated corner cube retroreflecting prism to the center of the torsion balance bar, causes a broad visible wavelength laser beam to strike the face of the corner cube, and observes the interference pattern ("fringes") between the beam reflected from the face and a second beam resulting from internal reflections in the prism in a manner described below in FIGS. 1 and 2. As also explained in the Figures, the motion of this interference pattern can be related uniquely to the rotation of the device without being sensitive to vibrations in the environment.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Although the present application is particularly suited for measuring extremely small forces, upon studying this application, those skilled in the art will recognize that the horizontal member of the present invention, as well as the supporting flexible member can be made proportionally larger, thus enabling the present invention to accurately measure much larger forces.

The term "bar" as used throughout the specification and claims is used for the sake of simplicity and is intended to include any and all apparatuses, structures, elements, materials, or combinations thereof which are capable supporting the prism employed by the invention. The "bar" of the present invention can be suspended from a fixed point or object and which does not permit, or at least substantially dampens, the ability of vibrational forces to travel therethrough.

The term "string" as used throughout the specification and claims is used for the sake of simplicity and is intended to include any and all apparatuses, structures, elements, materials, methods or combinations thereof by which the "bar" of the present invention can be suspended from a fixed point or object and which does not permit, or at least substantially dampens the ability of vibrational forces to travel therethrough. As such, the term "string" includes but is not limited to cables, ropes, strings, fibers, elastomeric members, combinations thereof, and the like.

One advantage of the present invention is that it is a sensitive motion sensor which responds only to rotation, not to translation. This distinction is important because the fringes observed using a standard interferometer were found, in our apparatus, to be completely washed out by vibrations in the environment, for example, from the vacuum pump attached to it. However, these vibrations do not affect the rotation of our torsion balance significantly, because the bar holding the test object and sensor is suspended from a wire or fiber, which does not transmit high frequency rotational motions to the bar.

Figure 1:
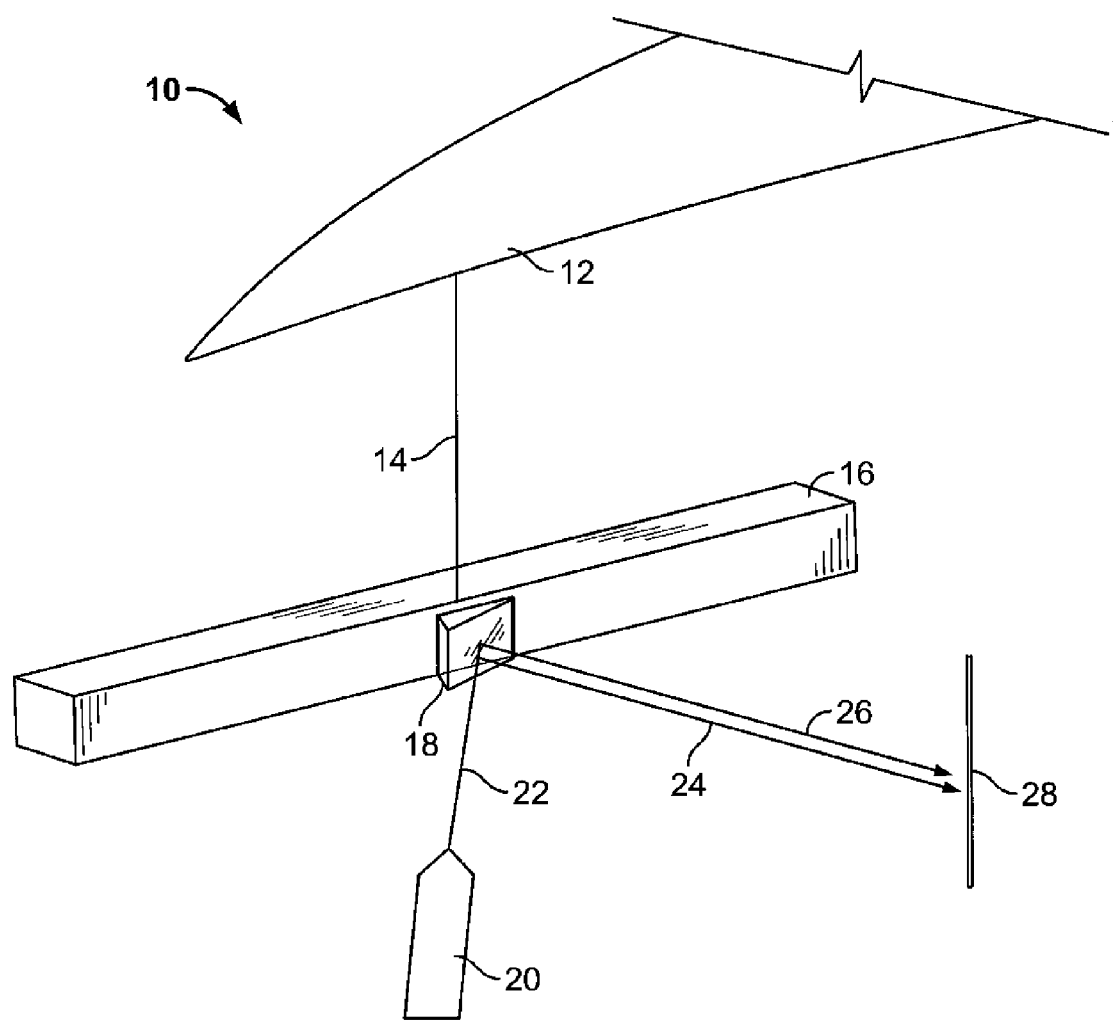
FIG. 1 is a drawing schematically illustrating a rotational movement sensor according to an embodiment of the present invention.

As illustrated in FIG. 1, an embodiment of the present invention preferably comprises a rotational sensor which can be used to measure forces including small forces. Sensor 10 preferably includes a fixed object or point 12 from which string 14 is preferably suspended. Bar 16 is preferably affixed to string 14 in such a manner that bar 16 is suspended in a substantially balanced horizontal position. Uncoated corner cube retroreflecting prism 18 is preferably disposed on bar 16 and is preferably positioned on a front or back side of bar 16. Additionally, prism 18 is most preferably disposed near a center portion of bar 16.

The prism 18 is preferably a corner cube prism and mounted to the bar 16 close to the center. A broad visible laser beam 22 emitted by laser light source 20 strikes the corner cube and produces two reflected beams 24,26. The origin of these is described in greater detail in FIGS. 2 and 3. These interfere on a screen 28 (or other receiver, such as an LCD camera in communication with a data processing device, such as a microprocessor), producing fringes 36 (shown in FIG. 3). As rotation occurs, these fringes move radially outward or inward, depending on the direction of rotation of the bar.

Figure 2:
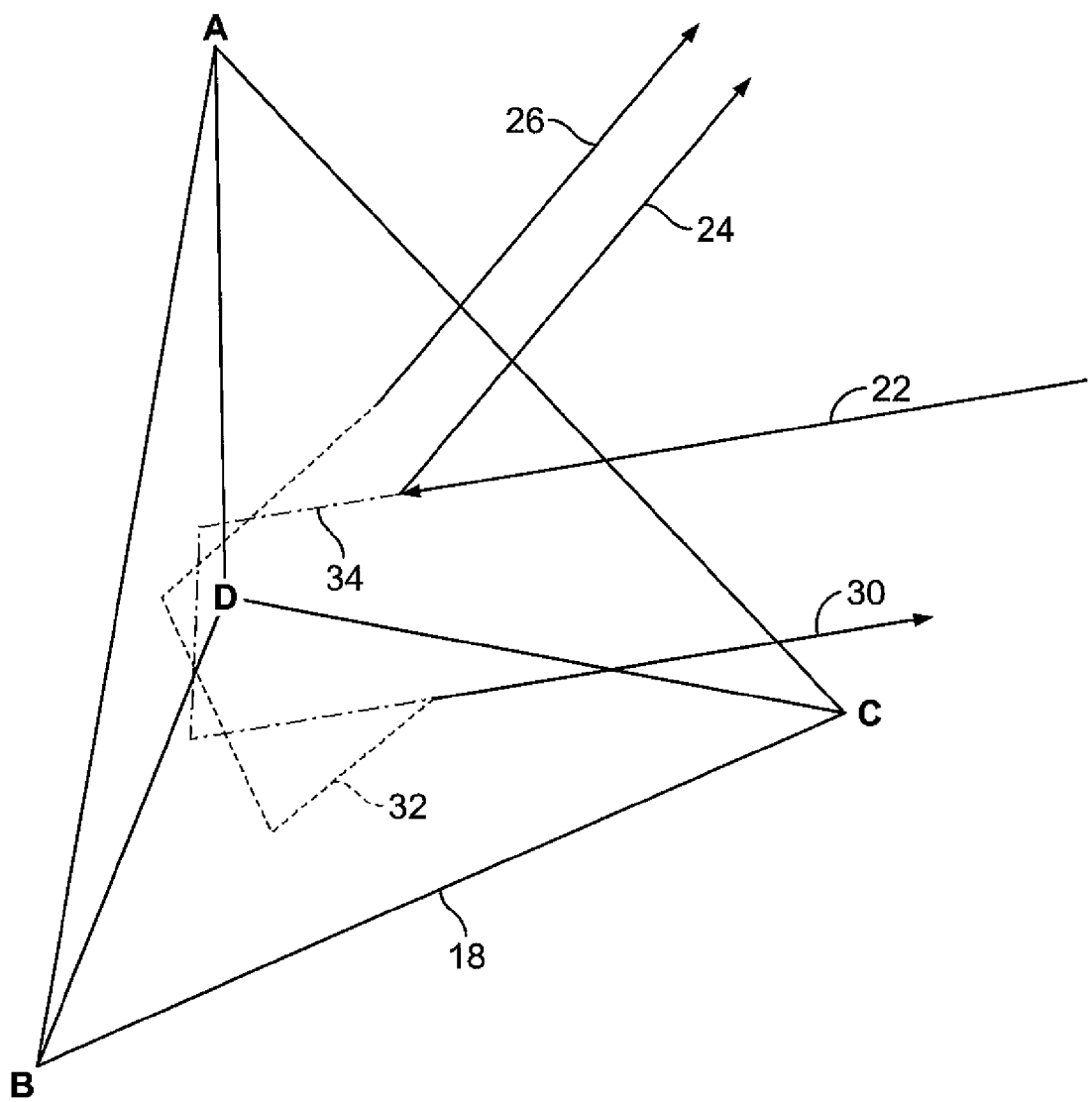
FIG. 2 is an off-axis top view drawing of an embodiment of the present invention which illustrates the optical paths for the prism.

FIG. 2 shows the origin of beams 24,26 in greater detail. The corner cube prism 18 is preferably a solid glass object with vertices (A), (B), (C) and (D). The angles made by the edges at (D) are all 90 degrees, hence "corner cube". Ray 22 strikes the front face ABC producing the reflected ray 24. It also passes through the prism and, after three internal reflections, produces external ray 30 which is exactly antiparallel to ray 22. Generation of antiparallel ray 30 independent of the orientation of the corner cube is the normal use of a corner cube. However, ray 30 also reflects internally off front face ABC, producing ray 32 which, after internal reflections produces ray 34 and then external ray 26, which is precisely parallel to ray 24. However, the phase difference between the rays 24,26 varies as the prism is rotated with respect to beam 22 due to small, angle-dependent differences between the total path length of rays 24,26.

Figure 3:
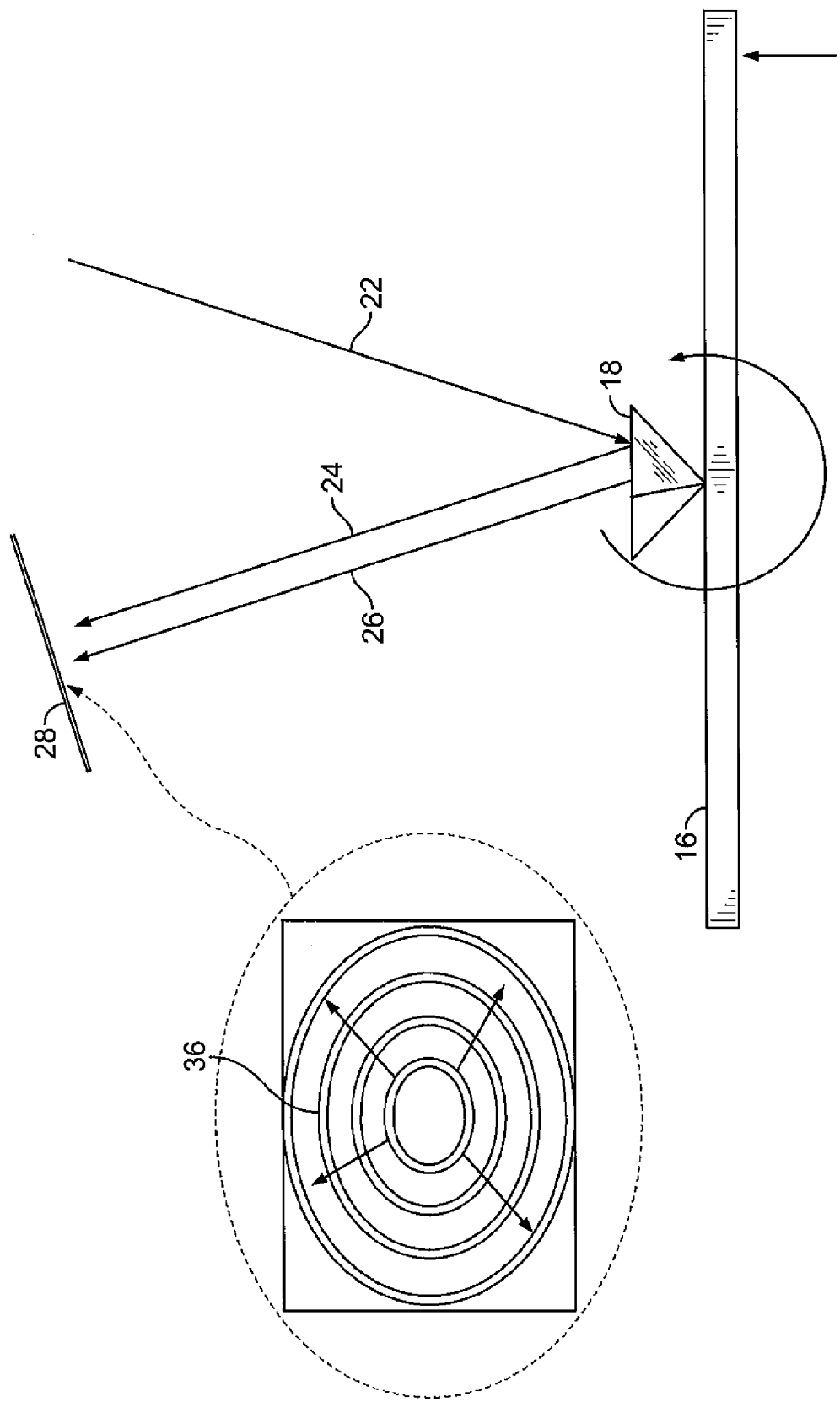
FIG. 3 is a side view drawing of an embodiment of the present invention which illustrates the optical paths for the prism of the present invention.

Because FIG. 2 may be difficult to understand, FIG. 3 is provided. FIG. 3 shows analogous behavior in two dimensions using a right-angle prism 18 which can imitate the behavior of the FIG. 2 prism in a plane, and could, in fact, be a more inexpensive realization of the present invention for applications where the rays are all in one plane.

EXAMPLES OF THE INVENTION'S APPLICABILITY

Industrial Applicability

The invention is further illustrated by the following non-limiting examples.

Example 1

In a practical example where edges AD, BD, CD were about 20 mm in length, Applicant measured the response of the corner cube interferometer to be about 120 microradians per fringe. Because it was easy to see a variation of ½ fringe on the screen, the sensitivity of this device was about 60 microradians. The device permitted one to measure the thrust of a nanosecond-pulse microthruster in a setup as shown in FIG. 1 with good repeatability when this thrust in several different circumstances was 0.3, 0.6, 1.6 and 1.8 micronewtons, in vacuum. These are very small forces—equivalent to the weight of a ¼-inch-long hair—which would be nearly impossible to measure in any other way in a device capable of supporting the microthruster, and sufficiently compact to attach to the torsion balance bar without interfering with its operation. Vibration sources in the experiment included the attached vacuum pump and the spinning disk which presents the fuel in the microthruster to the nanosecond-pulse laser, causing it to make a jet. These had no effect on the measurement.

Of course, the device would be proportionally more sensitive if the corner cube were larger. Also, it need not be made of solid glass, but faces ABD, BCD and ACD could be mirrors and face ABC a thin glass plate in order to facilitate more sensitive applications in space where weight is at a premium. A cube with one meter edges built in this way could have about 1 microradian sensitivity, and so on. This application would, of course, require a laser with adequate coherence length.

Example 2

In a second practical example, it was noticed that when a 532-nanometer wavelength solid-state laser providing beam 22 was first turned on, the fringes shifted rapidly for about ¼ second and then stabilized in a fixed pattern, as the laser cavity length stabilized during warm-up. This means that this interferometer coupled with a directional fringe counter could be a coarse but simple and rugged wavemeter able to register shifts in laser output frequency of order 2 GHz with a prism of the size used. A larger prism would give proportionally greater sensitivity.

Example 3

In a third example, this device could be used to accurately register and control the angular position of a rotating machine part in a vibrating environment.

The preceding examples can be repeated with similar success by substituting the generically or specifically described operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. A measuring apparatus sensitive to rotational but not translational or vibrational movement, said apparatus comprising:
   a bar suspended by a string;
   an interferometric prism attached to said bar;
   a light source directing a beam of coherent light at said prism; and
   a receiver receiving light reflected by said prism.

2. The apparatus of claim 1 wherein said prism is a corner cube prism.

3. The apparatus of claim 1 wherein said prism is a right-angle prism.

4. The apparatus of claim 1 wherein said light source and said prism produce fringe patterns at said receiver.

5. The apparatus of claim 4 wherein said fringe patterns change during rotational movement of said bar but do not change substantially during translational or vibrational movement of said measuring apparatus.

6. A method of measuring rotational movement without respect to translational or vibrational movement, the method comprising the steps of:
   suspending a bar by a string;
   attaching an interferometric prism to the bar;
   directing a beam of coherent light at the prism; and
   receiving light reflected by the prism.

7. The method of claim 6 wherein the prism is a corner cube prism.

8. The method of claim 6 wherein the prism is a right-angle prism.

9. The method of claim 6 wherein the beam and the prism produce fringe patterns in the receiving step.

10. The method of claim 9 wherein the fringe patterns change during rotational movement of the bar but do not change substantially during translational or vibrational movement of an object from which the string is suspended.

* * * * *